United States Patent [19]

Shirron et al.

[11] Patent Number: 5,408,612
[45] Date of Patent: Apr. 18, 1995

[54] MICROPROCESSOR SYSTEM FOR SELECTIVELY ACCESSING A PROCESSOR INTERNAL REGISTER WHEN THE PROCESSOR HAS CONTROL OF THE BUS AND PARTIAL ADDRESS IDENTIFYING THE REGISTER

[75] Intentors: Stephen F. Shirron, Acton, Mass.
Ralph O. Weber, Hudson, N.H.
Thomas E. Hunt, Brookline, N.H.

[73] Assignee: Digital Equipment Corporation, Maynard, Mass.

[21] Appl. No.: 942,246

[22] Filed: Sep. 9, 1992

[51] Int. Cl.⁶ ............... G06F 12/00; G06F 13/36; G06F 15/16
[52] U.S. Cl. ............... 395/275; 395/425; 395/250; 364/230.6; 364/956.3
[58] Field of Search ............... 395/275, 426, 725, 250

[56] References Cited

U.S. PATENT DOCUMENTS

| | | | |
|---|---|---|---|
| 4,777,590 | 10/1988 | Durkos et al. | 364/200 |
| 4,815,034 | 3/1989 | Mackey | 364/900 |
| 4,864,532 | 9/1989 | Reeve et al. | 364/900 |
| 4,905,184 | 2/1990 | Giridhar et al. | 364/900 |
| 5,031,091 | 7/1991 | Wakatsuki et al. | 364/200 |
| 5,034,913 | 7/1991 | Yokota et al. | 364/900 |

FOREIGN PATENT DOCUMENTS 166248 1/1986 European Pat. Off. .
2000889 1/1979 United Kingdom .

*Primary Examiner*—Thomas C. Lee
*Assistant Examiner*—Rehana P. Kriek
*Attorney, Agent, or Firm*—Arthur W. Fisher; Denis G. Maloney; Mark J. Casey

[57] ABSTRACT

An apparatus which allows for software sharing between multiple controllers includes a computer bus and a plurality of processors each having input and output ports coupled to the bus. Each processor also has at least one internal storage register. The apparatus further includes means, which are responsive to a signal indicating which one of the plurality of processors is controlling the computer bus and to a portion of address data on the bus, for issuing a control signal to one of the plurality of processors to permit that one processor access to at least one of its internal storage register when that processor issues a bus access request having an address which is within the range of addresses of all the processors.

16 Claims, 5 Drawing Sheets

MICROPROCESSOR SYSTEM FOR SELECTIVELY ACCESSING A PROCESSOR INTERNAL REGISTER WHEN THE PROCESSOR HAS CONTROL OF THE BUS AND PARTIAL ADDRESS IDENTIFYING THE REGISTER

BACKGROUND OF THE INVENTION

Generally, this invention relates to computer systems and more particularly to input/output (I/O) devices.

As is known in the art, computer systems include at least one central processing unit (CPU) and a memory system. A computer also includes a set of signal lines commonly referred to as a bus. The bus carries address, data, and control information to and from the CPU. The CPU executes instructions fetched from the memory to provide central control for the computer. Generally, the CPU sends and receives data via the bus from external devices commonly referred to as peripheral devices.

An input/output (I/O) interface device or module is generally coupled to the bus and is used to interface the bus and hence the CPU to the external devices, thereby facilitating communication between the CPU and the external devices. Examples of external devices include peripheral devices such as disk drives, tape drives, and printers. The I/O module includes circuits to effect the transfer of data between the CPU and external devices. Amongst these circuits are so called external device controllers, each of which is responsible for controlling the transfer of data between the I/O module and an external device. A device controller includes inter alia a processing unit and a bank of storage registers commonly referred to as control and status registers (CSRs) which are used by the device controller and the CPU for data manipulation and, peripheral device and device controller status reporting.

The individual device controllers execute software instructions stored in the random access memory which is typically resident on the I/O module. The software instructions are executed by the device controllers to transfer the data between the external devices and CPU when a request for data transfer is requested by the CPU. In normal operation, the CPU would perform a read data or write data operation to an external device by addressing a control and status register (CSR) within the appropriate controller for the external device. After addressing the particular controller's CSR, the CPU would write data into the addressed CSR instructing the controller as to the location in memory of the software instructions which need to be executed to accomplish the read or write operation.

In order to accomplish a read or write operation, it is often necessary for a controller to move or access data within its own bank of CSRs. There are commercially available controllers which allow for direct access of CSRs via an internal data path i.e., they are able to access their own CSRs without an external bus cycle. However, controllers are often designed which are not capable of accessing their own CSRs directly. For the latter type of controller it is therefore necessary for the controller to address itself in the same manner in which it would address memory locations not located within the controller (i.e. using an external bus cycle). For controllers which require an external bus cycle to access their own CSRs, the controller places an address on the bus including bits of address data indicating which memory space it needs to access, which controller chip it needs to access, and which CSR within the controller chip it needs to access. There are different approaches used to decode the address placed on the bus by the controller. One approach uses address decode logic which is incorporated into the controller. The address decode logic allows the controller to sense the address on the bus as being one indicating a destination within the range of its own CSRs. A second approach requires the use of separate address decode logic to decipher the address and generate a chip select to the appropriate controller. In both cases, each individual CSR within each controller must be assigned a unique address and to access any CSR requires placing that unique address on the bus. As a result, the software instructions which cause a controller to access its own CSRs contains the full address of the CSR including the address of the particular controller.

One problem with the above mentioned addressing scheme is that it precludes two similar controllers performing similar operations (i.e. accessing the same CSR within their respective bank of CSRs) from using the same software instruction to accomplish the operation. This occurs because software instructions executed by a controller which cause it to access its own CSRs will contain the full address of the CSR including the address of the controller. Thus, in order for a controller to access its own CSRs it is necessary to imbed the address of the controller within the software instruction that causes the controller to access its own CSRs. Two different controllers therefore can not use that instruction and hence can not use a common set of instructions for the same operations.

As an example of the effect of this problem, a software instruction which causes a first controller to access data located in a CSR located within the first controller, is not useable to cause a second controller to access data in a corresponding CSR located within the second controller. To overcome this problem requires that for each of these potential disparities, the affected software must be replicated for each controller. For an I/O module having several controllers, this replication requires a large amount of random access memory to store the replicated software instructions.

SUMMARY OF THE INVENTION

In accordance with the present invention, an apparatus includes a plurality of processors each having input and output ports coupled via a bus, with each of said processors having at least one internal storage register. The apparatus further includes means, responsive to a signal indicating which one of said plurality of processors is controlling said bus and to a portion of address data on said bus, for issuing a control signal to one of said plurality of processors to permit said one processor access to said at least one internal storage register of said one processor when said one processor issues a bus access request having an address which is within the range of addresses of said plurality of processors. With such an arrangement, apparatus is provided which permits a peripheral device controller to obtain access to its internal control and status registers (CSRs) without issuing the complete address of the CSR and controller. This permits a plurality of peripheral device controllers or other devices to share a common set of software instructions since the address of the controller is not imbedded in the software. Rather, only a portion of the address which corresponds to the general address space of the peripheral device controller as well as other peripheral device controllers is used to determine that a particular peripheral device controller desires to access its own CSRs.

DETAILED DESCRIPTION OF THE PREFERRED EMBODIMENT

Figure 1:
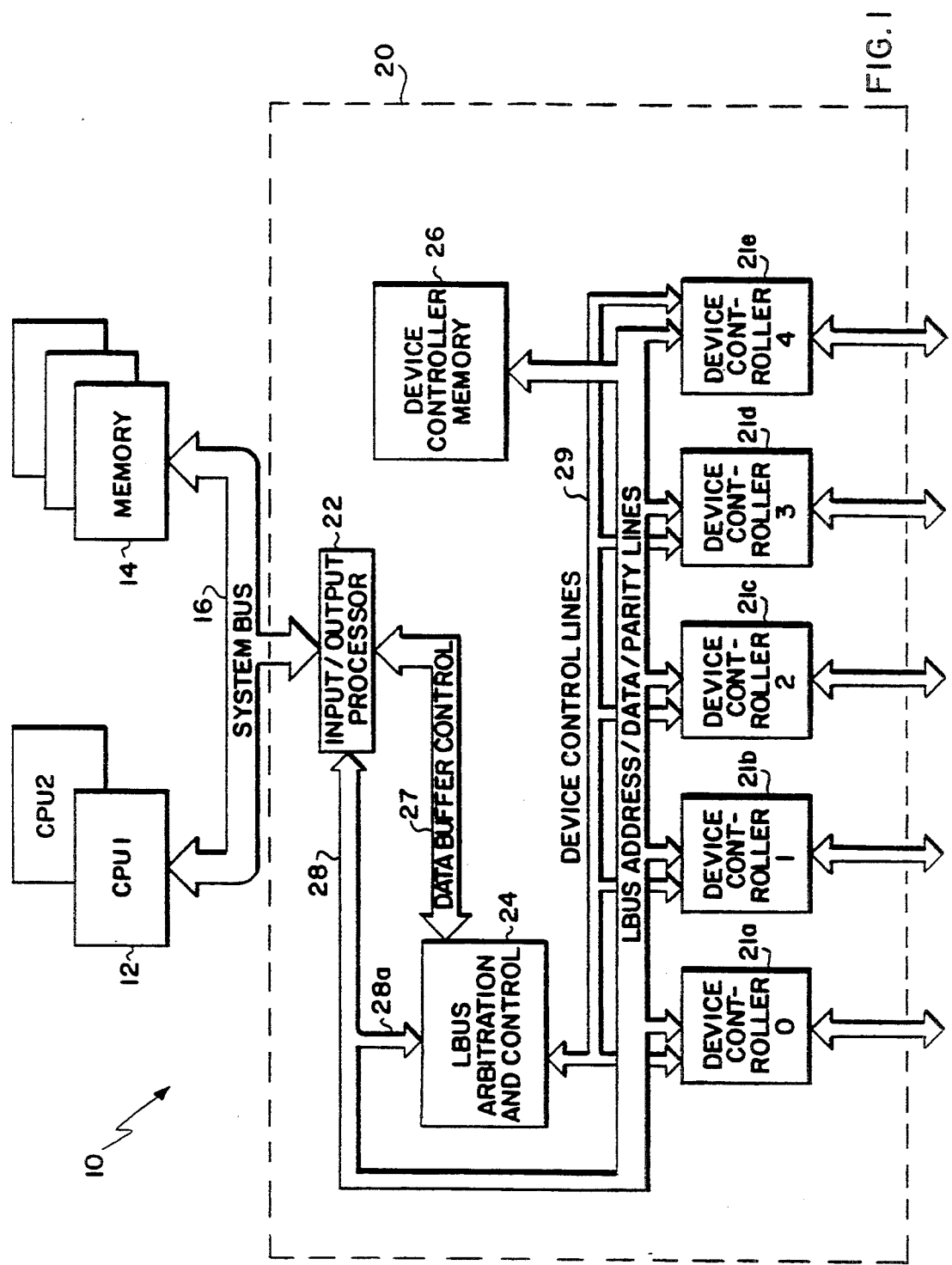
FIG. 1 is a block diagram of a computer system including an input/output subsystem.

Referring now to FIG. 1, a computer system 10 is shown to include a plurality of central processing units (CPUs) 12, a main memory bank 14 and an input/output (I/O) subsystem 20. The plurality of CPUs 12 are coupled to the main memory 14 and the input/output subsystem 20 via a system bus 16.

In particular, the I/O subsystem 20 is comprised of an I/O processor 22 which is used to control address, data, and control signal transfer between the system bus 16 and a local bus (LBUS) 28. Here the I/O subsystem 20 further includes five peripheral device controllers 21a–21e and a device controller memory 26 coupled via the LBUS 28, as shown. The five device controllers 21a–21e are used to process and format data transfers between peripheral devices (not shown) and the CPUs 12. Illustrative examples of peripheral devices typically associated with computer systems are disk storage devices, tape storage devices, optical storage devices and printers. The device controller memory 26 is here resident in the I/O subsystem 20 and is used as a storage area for the software instructions which are executed by the peripheral device controllers to effect the data transfer from a peripheral device to main memory or some other peripheral device.

The I/O subsystem 20 further includes an LBUS arbitration and control circuit 24 which is coupled to the I/O processor 22 and device controllers 21a–21e via the device control lines 29. The LBUS arbitration and control circuit 24 receives LBUS access requests from each of the five device controllers 21a–21e and the CPUs 12. The LBUS arbitration and control circuit 24 grants one of the controllers 21a–21e or CPUs 12 access to the LBUS by asserting its corresponding grant line (as for example grant line 43 (FIG. 5)). Each controller 21a–21e and CPUs 12 has a unique grant line which is part of the LBUS control lines 31. Each controller 21a–21e and CPUs 12 also has an associated LBUS access request line also resident among the LBUS control lines 31. In order to grant access to the LBUS, the LBUS arbitration and control circuit 24 sequentially samples each LBUS access request signal line. If a sampled line is asserted i.e, a device is requesting access to the LBUS, access to the LBUS is granted to the requesting device. If a sampled signal line is not asserted, the LBUS arbitration and control circuit 24 samples the next LBUS access request signal line. Once all access LBUS access request signal lines have been sampled, the LBUS arbitration and control circuit 24 starts over with the first sampled signal line and continues sampling and granting access in a sequential fashion. This type of query/grant technique is often referred to as "round robin" querying. LBUS access is granted to the requesting device via the LBUS control lines 31. The LBUS control lines 31 are comprised of signal lines (such as the LBUS access request and grant lines) and a portion of the LBUS data and address lines 28a.

Other techniques could alternatively be use to grant access to the requesting devices. For example, priority techniques could be implemented by the LBUS arbitration and control circuit 24. In any event, the LBUS arbitration and control circuit 24 will assert a control signal on the LBUS control lines 31 indicating to the requesting device that it has been given access to the LBUS.

During normal operation of the computer system 10, the CPUs 12 will need to send or retrieve data from a peripheral devices (not shown). In order to do so, the CPUs will write the starting address of software instructions stored in the random access memory 26 to a CSR within the appropriate peripheral device controller 21a–21e. The peripheral device controller will then read and execute the software instructions until the data has been read from or sent to the peripheral device. During the course of executing the software instructions and transferring data, the peripheral device controller may need to access its own CSRs for temporary storage and manipulation of data. Certain peripheral device controllers such as the NCR53C710 Small Computer System Interface (SCSI) controller are incapable of accessing their own internal CSRs directly without an external bus cycle. As a result, the peripheral device controllers must address their own CSRs in the same manner as if they were addressing some other memory location such as main memory 14. This addressing requirement usually dictates that the software instructions which cause a peripheral device controller to access its own CSRs contain the full address of the particular controller thereby precluding its use to perform a similar operation on a different peripheral device controller.

Figure 2:
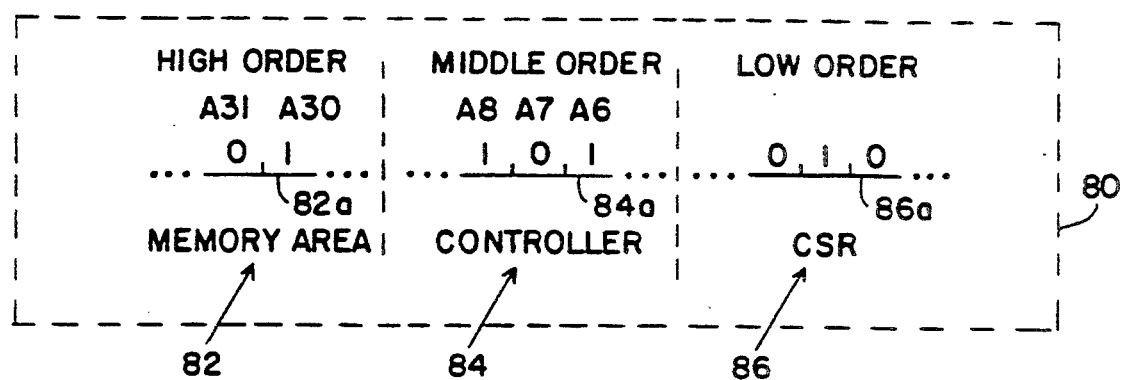
FIG. 2 is a representation of an address which is asserted on a computer bus.

Referring now also to FIG. 2, a typical address format 80 for peripheral device controller i.e., 21a–21e (FIG. 1), which has no direct internal access to its CSRs is shown. The peripheral device controller will place the address 80, which includes high order bits to indicate the general memory space (i.e., main memory, device controller memory, or CSR memory) 82, middle order bits 84 which indicate the general controller address space, and low order bits 86 which typically are reserved for register space, onto the LBUS 28 (FIG. 1). Address bits 82a of higher order bits 82 are used to indicate which general memory area is going to be accessed. Address bits 84a of space 84 indicate which controller is going to be accessed. When address bits 82a indicate an access to CSR memory, the address bits 84 are relevant to designate the particular controller 21a–21e (FIG. 1) and address bits 86 indicate which particular CSR within a selected controller is going to be accessed. That is, like address bits 84, address bits 86 are relevant when the high order bits 82 indicate an access to CSR memory.

In prior approaches, as mentioned above, since the address of the controller needs to be included in the address asserted by a controller seeking to access its own CSRs, this address must be imbedded into the software instruction which causes the controller to access its own CSRs. As a result, this instruction is not useable by any other controller seeking to perform the same access within its own bank of CSRs. As described below, the invention alleviates this problem by providing a means of generating a chip select signal to the proper peripheral device controller which is independent of the peripheral device controller addressing signals when that peripheral device controller is seeking access to its own internal CSRs.

Figure 3:
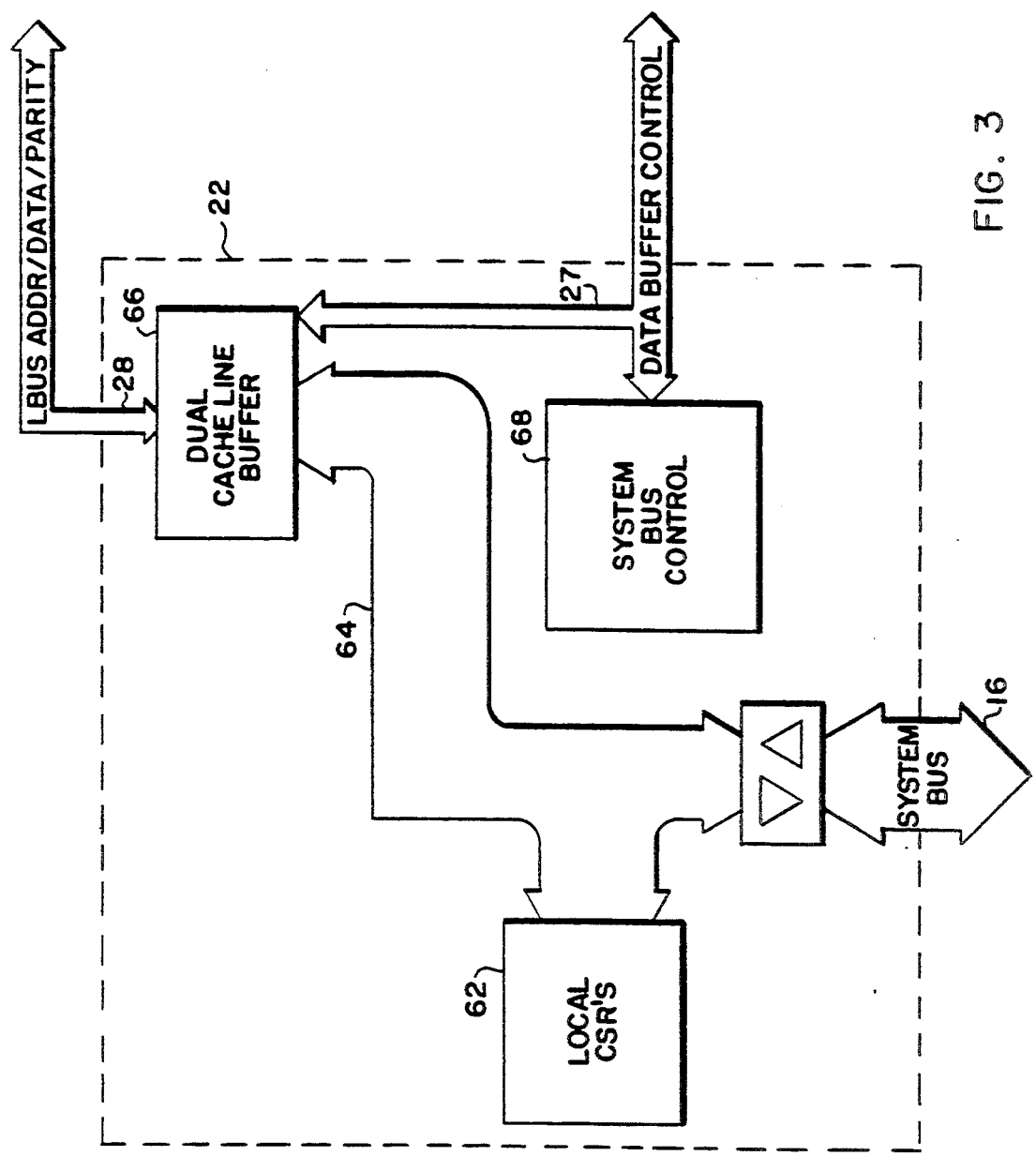
FIG. 3 is a block diagram of an input/output processor of the input/output subsystem used in the computer system of FIG. 1.

Referring now to FIG. 3, the I/O processor 22 (FIG. 1) is shown to include inter alia a dual cache line buffer 66, local control and status registers (CSRs) 62, and a system bus control circuit 68. The dual cache line buffer 66 and the local CSRs 62 are coupled by an internal bus 64. The I/O processor 22 is coupled to the other I/O subsystem components via the LBUS 28. The I/O processor 22 provides signals and proper data formats to interface the CPUs and main memory of the computer system to the peripheral device controllers. Data transfer between the system bus and the peripheral device controllers passes through the I/O processor 22. The local CSRs 62 and the dual cache line buffer 66 are used for temporary storage and manipulation of data going to or coming from the peripheral device controllers. The main function of the dual cache line buffer is to resolve differences in data formats which occurs as a result of the system bus 16 (FIG. 1) and the LBUS 28 using different data formats during transmission. In addition, by using the I/O processor's buffering capability, the CPUs 12 (FIG. 1) are free to perform other operations while the peripheral device controllers are filling the I/O processor's buffer with data to be transferred or while the peripheral device controllers are reading the data supplied to the I/O processor by the CPUs.

Figure 4:
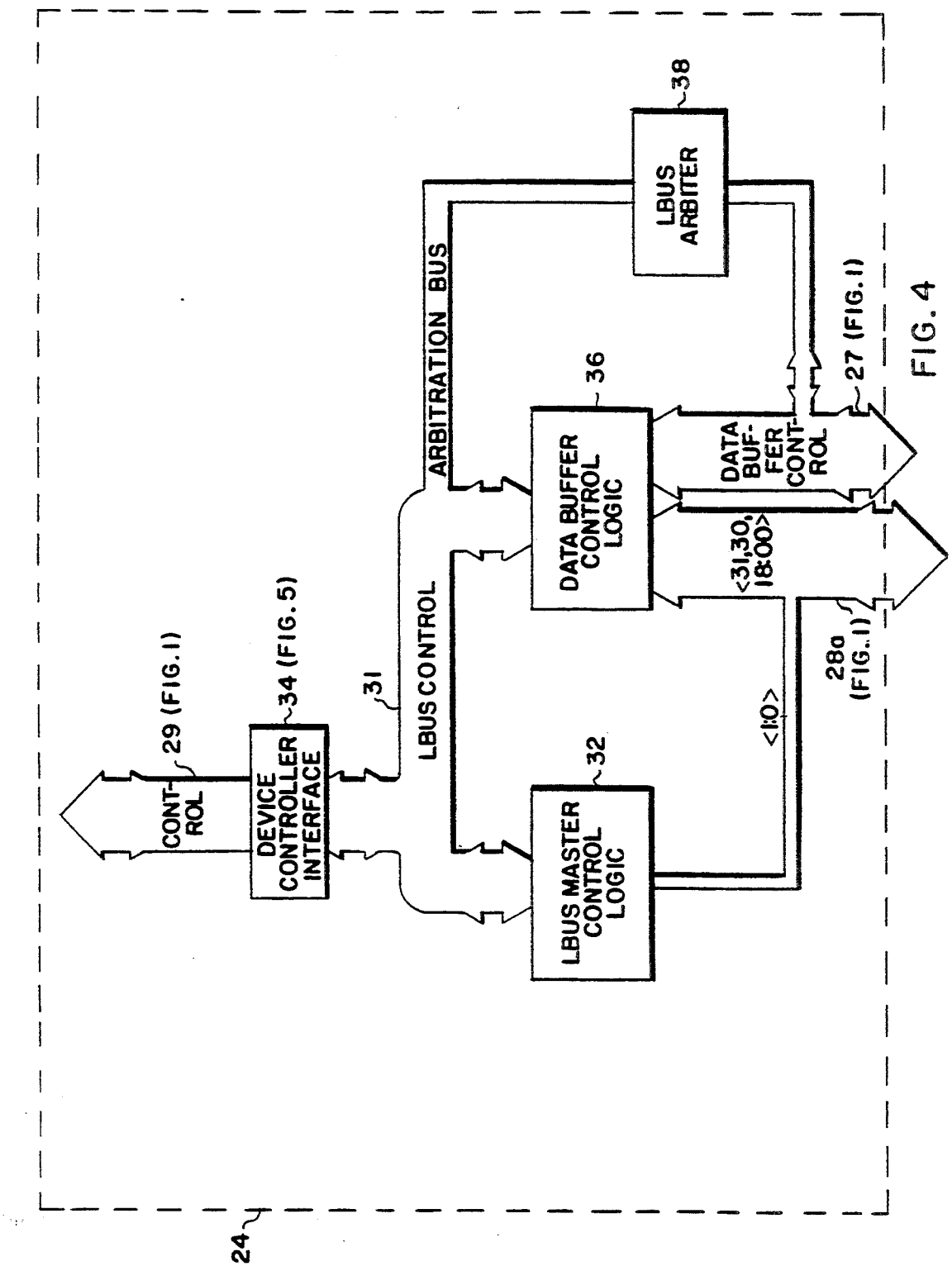
FIG. 4 is a block diagram of a local bus arbitration and control circuit used in the input/output subsystem used in the computer system of FIG. 1.

Referring now to FIG. 4, the LBUS arbitration and control circuit 24 (FIG. 1) is shown to further include an LBUS master control circuit 32, a data buffer control circuit 36, an LBUS arbiter 38, and a device controller interface 34. These circuits are coupled together via LBUS control lines 31 as shown. To initiate a read or write operation to a peripheral device, one of the CPUs 12 (FIG. 1) generates an LBUS access request. In response to an LBUS access request from the CPUs 12, the LBUS master control circuit 32 and the LBUS arbiter circuit 38 work to provide the CPUs access to the LBUS 28 allowing the requesting CPU to communicate with an external device via one of the peripheral device controllers.

After being given control of the LBUS 28 (FIG. 1), the CPUs 12 (FIG. 1) provide a peripheral device controller with the address of a storage location within the device controller memory 26 which corresponds to the starting address of the instructions which will be executed by the peripheral device controller to effect the read or write operation requested by the CPUs. Once the starting address of the instructions is received, the peripheral device controller will begin executing the instructions until the read or write operation is complete.

While performing a read or write operation a peripheral device controller may need to access its internal control and status registers (CSRs) for temporary storage and manipulation of data. Often, peripheral device controllers such as the NCR53C710 SCSI controller are designed in a manner which precludes the controller from accessing its own CSRs directly. As a result, a controller which requires access to its own CSRs addresses its own CSRs as if it were addressing some other memory location such as the device controller memory 26. That is, the controller requests access to the LBUS, places an address on the bus which represents the CSR it desires to access, and writes (or reads) data over the LBUS to (or from) its CSR.

Figure 5:
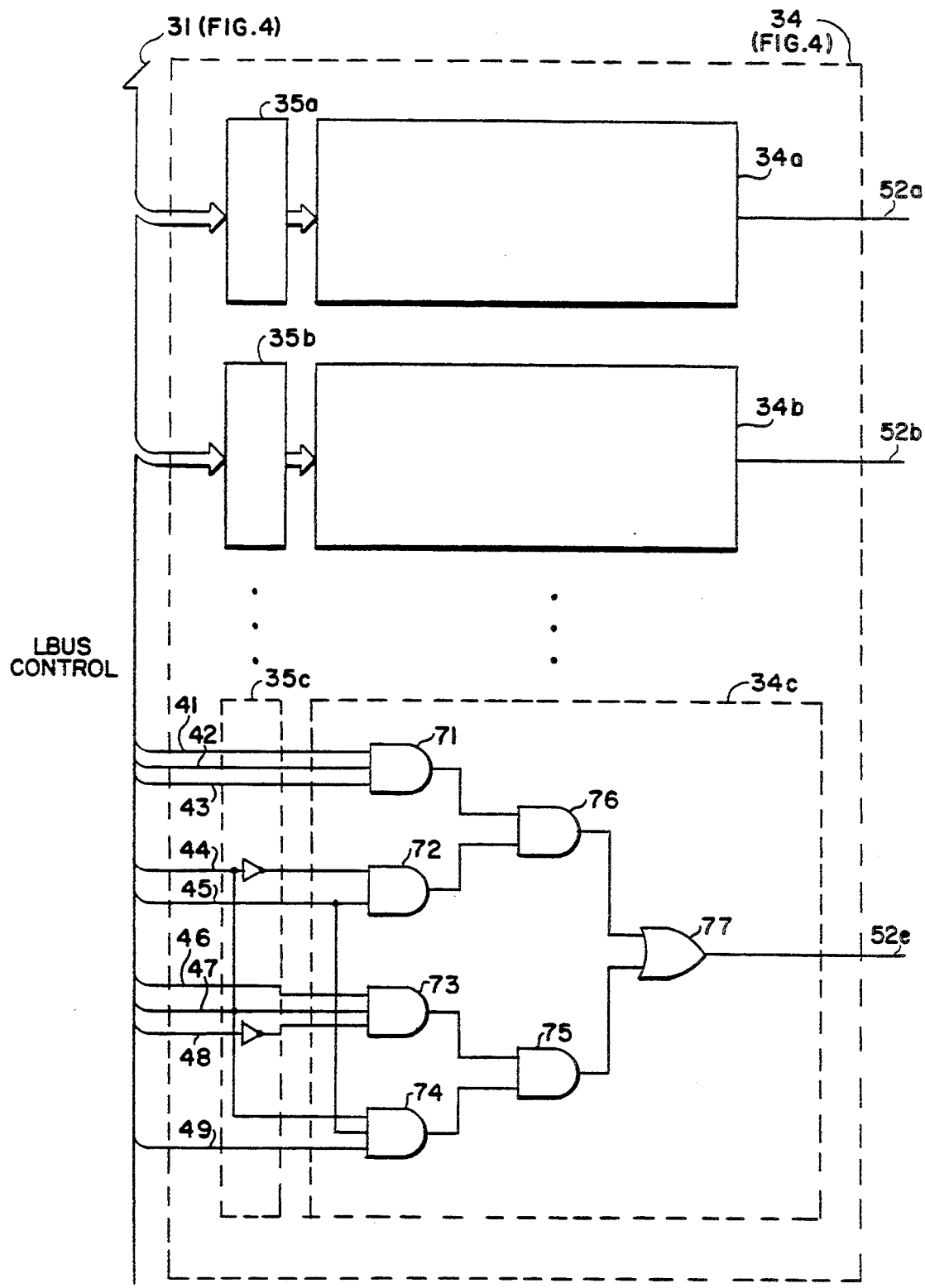
FIG. 5 is schematic diagram of the combinational logic circuit which provides the chip select signals to the peripheral device controllers of a computer system.

Referring now to FIG. 5, the device controller interface 34 is shown to include a plurality of combinational logic circuits 34a-34e which are used to generate any one of a corresponding plurality of chip select signals 52a-52e. Each one of the chip select signals 52a-52e is coupled to a corresponding one of said peripheral device controller 21a-21e (FIG. 1). A particular one of the chip select signals 52a-52e is asserted for the corresponding peripheral device controller when that corresponding peripheral device controller or some other device is requesting access to the corresponding peripheral device controller's CSRs. Each chip select signal 52a-52e is coupled to a separate peripheral device controller and is generated by a one of the logic circuits 34a-34e. Here each of said circuits 34a-34e is identical. Thus, to accommodate differences resulting from different controller addresses, address decoder circuits 35a-35e are provided between the inputs of the networks 34a-34e and the signals used as inputs thereto. Address decoder circuits 35a-35e are selectively comprised of inverters (as shown for circuit 35e). Depending on the address of the controller, none, some, or all of lines 44-48 will be inverted prior to being fed to the respective networks 34a-34e. For example, chip select signal 52e is generated by the logic circuit 34e. Logic circuit 34e and chip select signal 52e are specific to peripheral device controller 21a (FIG. 1) whereas, logic circuits 34a-34d and chip select signals 52a-52d are specific to peripheral device controllers 21b-21e respectively (FIG. 1).

The chip select signals 52a-52e are provided by decoding a portion of the LBUS signal lines thereby eliminating the need to imbed the address of the controller into the software instructions which cause the peripheral device controllers to access their own CSRs. The general address space of all controller CSRs is included in the particular software instructions rather than an entire controller address of a particular peripheral device controller. By utilizing the combinational logic circuits 34a-34e, the same software instructions which cause one peripheral device controller to access its own CSRs can be used by all of the other peripheral device controllers. As a result, the number of software instructions required for all peripheral devices is greatly reduced and consequently, the amount of memory needed to store those software instructions is also greatly reduced.

A chip select signal is generated via logic circuits 34a-34e to the proper device controller as a result of analyzing signal lines 41-49 of the LBUS control lines 31. For example, here, signal lines 41 and 42 correspond to LBUS address bits A30 and A31 (FIG. 2). These two bits are part of the general address space 82 (FIG. 2) and are used during addressing to indicate the general memory area which is to be accessed e.g., main memory, device controller memory, or CSR space. When a device controller is trying to access CSR space, here illustratively, bits A30 and A31 will be asserted. Signal line 43 caries a bus access grant signal. The bus access grant signal on line 43 is asserted by the LBUS arbitration and control circuit 24 (FIG. 4) to give a particular peripheral device controller access to (i.e. control of) the LBUS 28 (FIG. 1). Each peripheral device controller is coupled to a separate grant line. The grant line 43 is unique or specific to a particular peripheral device controller, here 21a (FIG. 1). Signal line 44 is a master-/slave indicator signal line also generated by the LBUS arbitration and control circuit 24 (FIG. 1). This signal line is asserted when the CPUs 12 (FIG. 1) or some other device is controlling the LBUS 28 (FIG. 1) and is de-asserted when one of the five peripheral device controllers 21a–21e (FIG. 1) is controlling the LBUS. Signal line 45 is a so called "address strobe" signal line which is asserted by the particular peripheral device controller which is accessing its CSRs (or having its CSRs accessed). When a peripheral device controller is seeking to access its own CSRs, it will request control of the LBUS from the LBUS arbitration and control circuit 24 (FIG. 1). Once it has been granted control of the LBUS, (indicated by signal line 43 being asserted) the controller will place an address on the LBUS wherein signal lines 41 and 42 are asserted. Having signal lines 41, 42, and 43 asserted will cause the output of AND gate 71 to be "TRUE" or asserted. Additionally, since the peripheral device controller is the device controlling the bus, signal line will 44 be de-asserted. Also, the peripheral device will assert its so called "address strobe" line on signal line 45. Having signal line 44 de-asserted and signal line 45 asserted will result in an output of "TRUE" from AND gate 72 (as well as an output of "FALSE" from AND gate 74). Now, having the outputs of AND gates 71 and 72 be "TRUE" will cause the output of AND gate 76 to be "TRUE". At this point, since the output of AND gate 76 serves as an input to the OR gate 77 and is "TRUE", the output of the OR gate 77 will become "TRUE" regardless of the output of AND gate 75 (the other input to OR gate 77). Since the output of the OR gate 77 is the chip select signal 52e, a chip select signal is generated to the proper peripheral device controller independent of the peripheral device controller address bits A6, A7, and A8 (FIG. 2). As a result, the use of logic circuits 34a–34e to generate chip select signals 52a–52e alleviates the need to imbed the controller address into the software instructions which cause a peripheral device controller to access its own CSRs. As an illustration, the middle order bits 84 (FIG. 2) of an address imbedded into a software instruction which causes the controller to access its own CSRs would be so called "don't care" bits. When the address 80 (FIG. 2) is asserted on the bus and the signal lines 41–45 are in the state which indicates a controller is seeking to access its own CSRs, middle order bits 84 (FIG. 2) are ignored by the logic circuit 34 which is still able to generate a chip select signal to the proper controller. Consequently, a common set of software instructions can be used for all controllers to perform operations which cause them to access their own internal CSRs.

Signal lines 46, 47, and 48 are address bits A6, A7, and A8 respectively of the LBUS 28 (FIG. 1). These address bits are used by the logic circuit 34e to generate a chip select to a peripheral device controller when a device other than the peripheral device controller itself is seeking to access the internal CSRs. For example, when the signal lines 46, 47, and 48 are all de-asserted (or address bits A6, A7, and A8 evaluate to zero), peripheral device controller 21a (FIG. 1) is being addressed. In general, when a device other than the peripheral device controller itself accesses the controller's CSRs, addressing of the controller is accomplished via signal lines 46, 47, and 48. These signal lines are coupled to each logic circuit in a similar manner as shown in logic circuit 34e. The only difference between logic circuits 34a–34e is the configuration of circuits 35a–35e. The differences in configuration of circuits 35a–35e are determined by presence or absence of inverters between signal lines 46–48 and the AND gate 73. As an illustration, consider logic circuit 34a. Within logic circuit 34a, there would not be an inverter between signal line 48 and the AND gate 73. Therefore, to address peripheral device controller number 4 (shown as item 21e in FIG. 1), address lines 46 and 47 would be de-asserted while address line 48 would be asserted (i.e., address bits A6, A7, and A8 would evaluate to 4). The same principle is used in addressing peripheral device controllers 21b, 21c, and 21d (FIG. 1). Signal line 49 is a so called "controller cycle" signal line. This signal line is asserted when the address placed on the LBUS 28 (FIG. 1) is a device other than the peripheral device controller itself.

Having described a preferred embodiment of the invention, it will now become apparent, to one of skill in the art that other embodiments incorporating its concepts may be used. It is felt therefore, that this embodiment should not be limited to the disclosed embodiment, but rather should be limited only by the spirit and scope of the appended claims.

What is claimed is:

1. A processing system for allowing a processor to selectively access at least one of its associated internal storage registers, said system comprising:

a bus;

a processor having input and output ports coupled to said bus, said processor having at least one internal storage register, said at least one internal storage register having an address within said processor; and means, responsive to a signal indicating that said processor is controlling the bus and to a portion of address data on said bus, for issuing a control signal to give said processor having control of the bus access to said at least one internal storage register, said address data on said bus including bits for identifying said processor and said address within said processor, and said portion of address data on said bus not including said bits for identifying said processor.

2. The system of claim 1 further comprising a computer and a peripheral device coupled to said bus wherein said processor controls communication between said computer and said peripheral device.

3. The system of claim 1 further comprising a bus arbiter circuit wherein said signal indicating which processor is controlling said bus is generated by said bus arbiter circuit.

4. The system of claim 1 wherein said means for issuing a control signal comprises a combinational logic circuit coupled to said bus and to said processor.

5. The system of claim 1 wherein said register is a control and status register.

6. A multiprocessor system for allowing a processor to selectively access at least one of its associated internal storage registers, said system comprising:

a bus;

a plurality of processors, each having input and output ports coupled to said bus, each of said processors having at least one internal storage register, said at least one internal storage register of each said plurality of processors having the same address within each of said plurality of processors;

means, responsive to a signal indicating which one of said plurality of processors is controlling said bus and to a portion of address data on said bus, for issuing a control signal to give said one processor having control of said bus access to said at least one of its associated internal storage registers, said address data on said bus including bits for identifying said one of said plurality of processors and said address within said processor, and said portion of address data on said bus not including said bits for identifying said one of said plurality of processors.

7. The system of claim 6 further comprising a computer and a plurality of peripheral devices wherein said plurality of processors control communication between said computer and said plurality of peripheral devices.

8. The system of claim 6 wherein said means for issuing a control signal comprises a plurality of combinational logic circuits coupled to said bus and to said plurality of processors.

9. The system of claim 6 wherein said register is a control and status register.

10. An input/output controller device for allowing a processor to selectively access at least one of its associated internal storage registers, said controller device comprising:
   an internal computer bus;
   means for interfacing said internal computer bus to an external computer bus;
   a random access memory;
   a plurality of processors, each having input and output ports coupled to said internal computer bus, each of said processors having at least one internal storage register wherein said at least one internal storage register has the same address within each of said plurality of processors, and each of said processors capable of executing instructions stored in said random access memory;
   means, responsive to a signal indicating which one of said plurality of processors is controlling said internal computer bus and to a portion of address data on said internal computer bus, for issuing a control signal to give said one processor having control of said internal computer bus access to said at least one of its associated internal storage registers, said address data on said internal computer bus including bits for identifying said one of said plurality of processors and said address within said processor, and said portion of address data on said bus not including said bits for identifying said one of said plurality of processors.

11. The system of claim 10 wherein said means for issuing a control signal to one of said plurality of processors comprises a plurality of control signals.

12. The system of claim 11 wherein said means for issuing said plurality of control signals comprises a combinational logic circuit coupled to said bus and to said plurality of processors.

13. The system of claim 12 wherein said combinational logic circuit comprises a plurality of essentially identical combinational logic circuits.

14. The system of claim 10 wherein said register is a control and status register.

15. In a multiprocessor system having a bus and plurality of processors, a method for allowing each of said plurality of processors to selectively access an associated one of its internal storage registers, said method comprising the steps:
   asserting an address on said bus, said address asserted on said processor bus including bits for identifying said one of said plurality of processors and bits for identifying an address of said one internal storage register within said plurality of processors;
   examining a portion of said address asserted on said bus, said portion of said address not including bits for identifying said one of said plurality of processors;
   determining which one of said plurality of processors is asserting said address on said bus; and
   generating in response to said examining step and said determining step a chip select signal to said one of said plurality of processors asserting said address on said processor bus.

16. The method of claim 15 wherein said registers are control and status registers.

* * * * *